United States Patent
Nakada et al.

(10) Patent No.: US 12,190,738 B2
(45) Date of Patent: Jan. 7, 2025

(54) OPERATION SUPPORT APPARATUS OF TRANSPORTATION MEANS, OPERATION SUPPORT METHOD OF TRANSPORTATION MEANS, AND RECORDING MEDIUM STORING OPERATION SUPPORT PROGRAM FOR TRANSPORTATION MEANS

(71) Applicant: NEC Corporation, Tokyo (JP)

(72) Inventors: Suguru Nakada, Tokyo (JP); Yuka Enjoji, Tokyo (JP); Erika Koshino, Tokyo (JP); Takashi Yamashita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 559 days.

(21) Appl. No.: 17/498,950

(22) Filed: Oct. 12, 2021

(65) Prior Publication Data

US 2022/0130262 A1    Apr. 28, 2022

(30) Foreign Application Priority Data

Oct. 26, 2020    (JP) .................... 2020-179018

(51) Int. Cl.
  G08G 5/00    (2006.01)
  G06F 40/211    (2020.01)
  G08G 5/04    (2006.01)

(52) U.S. Cl.
  CPC ......... *G08G 5/0026* (2013.01); *G06F 40/211* (2020.01); *G08G 5/0082* (2013.01); *G08G 5/04* (2013.01)

(58) Field of Classification Search
  CPC ... G06F 40/211; G06F 40/253; G08G 5/0013; G08G 5/0026; G08G 5/0043;
  (Continued)

(56) References Cited

U.S. PATENT DOCUMENTS

| 2015/0162001 A1* | 6/2015 | Kar ..................... G08G 5/0013 704/235 |
| 2017/0039858 A1* | 2/2017 | Wang .................... G10L 15/08 |
| 2019/0122564 A1* | 4/2019 | Singla .................. G08G 5/0013 |

FOREIGN PATENT DOCUMENTS

| CN | 101916565 A | 12/2010 |
| JP | 2000-347558 A | 12/2000 |

(Continued)

OTHER PUBLICATIONS

Japanese Office Action for JP Application No. 2020-179018 mailed on Aug. 30, 2022 with English Translation.

(Continued)

*Primary Examiner* — Angela A Armstrong
(74) *Attorney, Agent, or Firm* — Sughrue Mion, PLLC

(57) ABSTRACT

An operation support apparatus includes: an acquisition unit that acquires an operation status of transportation means; a generation unit that performs processing of recognizing voices of a first staff who gives an instruction to operate the transportation means and a second staff who is instructed by the first staff, and generates character information obtained by converting the recognized voice into characters; a detection unit that performs syntax analysis on the character information and detects wrong recognition by the first or second staff; and a display control unit that displays the character information and the detection result of the wrong recognition by the detection unit on a display device visually recognizable by the first staff, thereby reducing occurrence of an accident due to the wrong recognition by the staff related to operation of the transportation means at a site where the transportation means is operated.

14 Claims, 5 Drawing Sheets

(58) Field of Classification Search
CPC ........ G08G 5/0082; G08G 5/04; G10L 15/22; G10L 2015/22; G10L 2015/221
See application file for complete search history.

(56) References Cited

FOREIGN PATENT DOCUMENTS

| | | |
|---|---|---|
| JP | 2004-145566 A | 5/2004 |
| JP | 2008-070805 A | 3/2008 |
| JP | 2010-195075 A | 9/2010 |
| JP | 2011-150435 A | 8/2011 |
| JP | 2013-134700 A | 7/2013 |

OTHER PUBLICATIONS

Japanese Office Action for JP Application No. 2020-179018 mailed on Oct. 26, 2021 with English Translation.

* cited by examiner

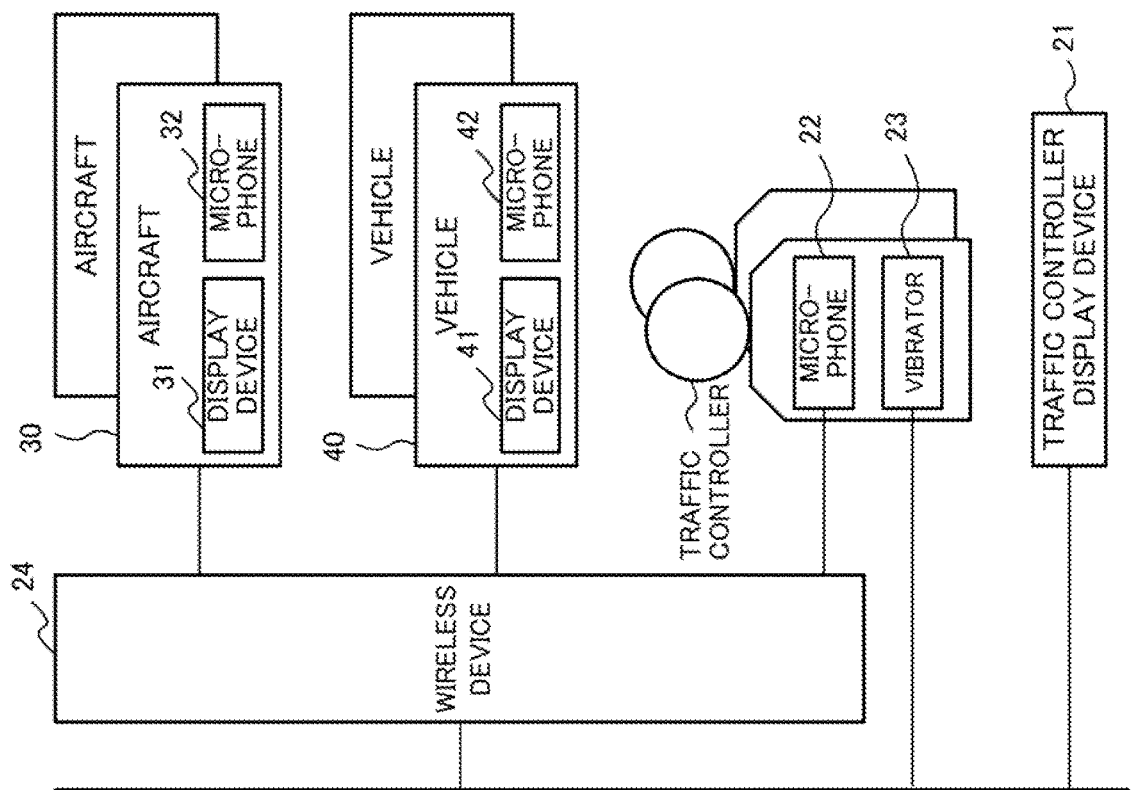
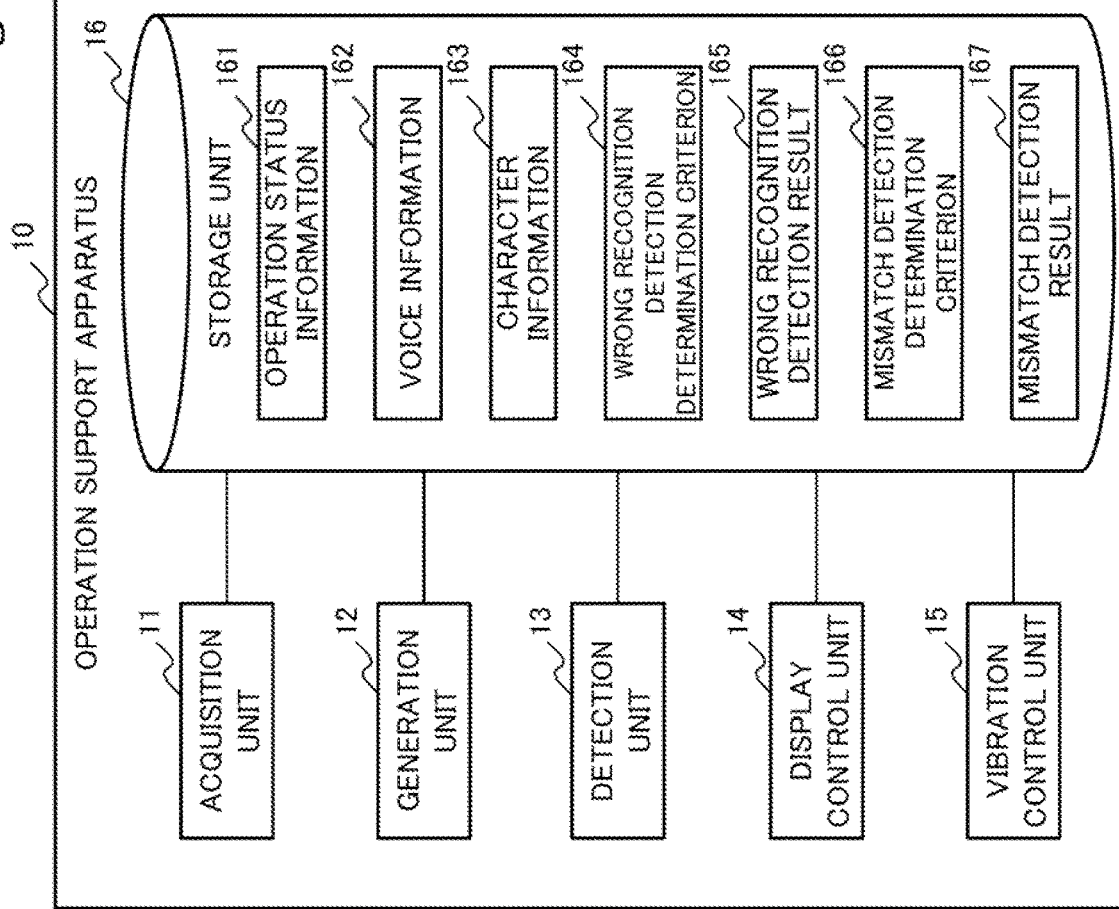
Fig. 1

OPERATION SUPPORT APPARATUS OF TRANSPORTATION MEANS, OPERATION SUPPORT METHOD OF TRANSPORTATION MEANS, AND RECORDING MEDIUM STORING OPERATION SUPPORT PROGRAM FOR TRANSPORTATION MEANS

This application is based upon and claims the benefit of priority from Japanese Patent Application No. 2020-179018, filed on Oct. 26, 2020, the disclosure of which is incorporated herein in its entirety by reference.

TECHNICAL FIELD

The present invention relates to an operation support apparatus of transportation means, an operation support method of transportation means, and an operation support program for transportation means.

BACKGROUND ART

For example, in air traffic control, a traffic controller is required to always accurately grasp an operation (flight) status of an aircraft, an existence status of an aircraft or a vehicle on a runway, and the like, and to issue an appropriate instruction to a pilot, a driver of the vehicle, or the like. However, since there are a wide variety of information that needs to be grasped by the traffic controller, there are many cases where an accident is likely to occur due to misstatement or determination mistake of the traffic controller. Therefore, in order to prevent accidents caused by such misstatement or determination mistake of the traffic controller a technology for supporting staffs involved in an operation of transportation means such as a traffic controller is expected.

As technologies related to such a technology, Patent Literature 1 (JP 2004-145566 A) discloses an air traffic control instruction error correction device that outputs warning information to a speaker and an information display device when air traffic control information obtained from an air traffic control information management device does not include an aircraft identification name issued by a traffic controller.

In addition, Patent Literature 2 (JP 2011-150435 A) discloses a traffic control system in which, when a traffic controller in charge selects a traffic control target, which is a target of a traffic control instruction at the present time from the traffic control target information, and utters a traffic control instruction voice and performs the traffic control instruction by wireless communication, in a case where a result of analyzing the traffic control instruction voice is different from the selected traffic control target, a notification of an erroneous utterance is given to the traffic controller in charge.

In addition, Patent Literature 3 (JP 2000-347558 A) discloses a traffic controller training device that simulates an operation scenario of an aircraft, recognizes a voice from a training traffic controller, and has a function of synthesizing a voice that reports a response to the recognized voice to the traffic controller, and performs training of the controller by recognizing an instruction of the traffic controller according to the scenario and performing a voice response.

SUMMARY

A main object of the present invention is to provide an operation support apparatus of transportation means that reduces the occurrence of an accident due to wrong recognition of a staff related to the operation of transportation means at a site where the transportation means is operated.

According to an aspect of the present invention, an operation support apparatus for transportation means includes: an acquisition unit that acquires an operation status of the transportation means; a generation unit that performs processing of recognizing voices of a first staff who gives an instruction to operate the transportation means and a second staff who is instructed by the first staff, and generates character information obtained by converting the recognized voice into characters; a detection unit that performs syntax analysis on the character information and detects wrong recognition by the first or second staff indicated by the character information on the basis of the operation status, a result of the syntax analysis, and a first determination criterion; and a display control unit that displays the character information and a detection result of the wrong recognition by the detection unit on a first display device visually recognizable by the first staff.

In another aspect of achieving the above object, according to an aspect of the present invention, an operation support method of transportation means includes: acquiring, by an information processing apparatus, an operation status of the transportation means; performing processing of recognizing voices of a first staff who gives an instruction to operate the transportation means and a second staff who is instructed by the first staff; generating character information obtained by converting the recognized voice into characters; performing syntax analysis on the character information; detecting wrong recognition by the first or second staff indicated by the character information on the basis of the operation status, a result of the syntax analysis, and a first determination criterion; and displaying the character information and a detection result of the wrong recognition on a first display device visually recognizable by the first staff.

Further, from a further viewpoint of achieving the above object, according to an aspect of the present invention, an operation support program for transportation means causes a computer to execute: an acquisition process of acquiring an operation status of the transportation means; a generation process of performing a process of recognizing voices of a first staff who gives an instruction to operate the transportation means and a second staff who is instructed by the first staff and generating character information obtained by converting the recognized voice into characters; a detection process of performing syntax analysis on the character information and detecting wrong recognition by the first or second staff indicated by the character information on the basis of the operation status, a result of the syntax analysis, and a first determination criterion; and a display control process of displaying the character information and a detection result of the wrong recognition by the detection process on a first display device visually recognizable by the first staff.

Furthermore, the present invention can also be achieved by a non-volatile computer-readable recording medium storing the operation support program (computer program) for transportation means.

BRIEF DESCRIPTION OF THE DRAWINGS

FIG. 1 is a block diagram illustrating a configuration of an operation support apparatus according to a first example embodiment of the present invention;

EXAMPLE EMBODIMENT

Figure 2:
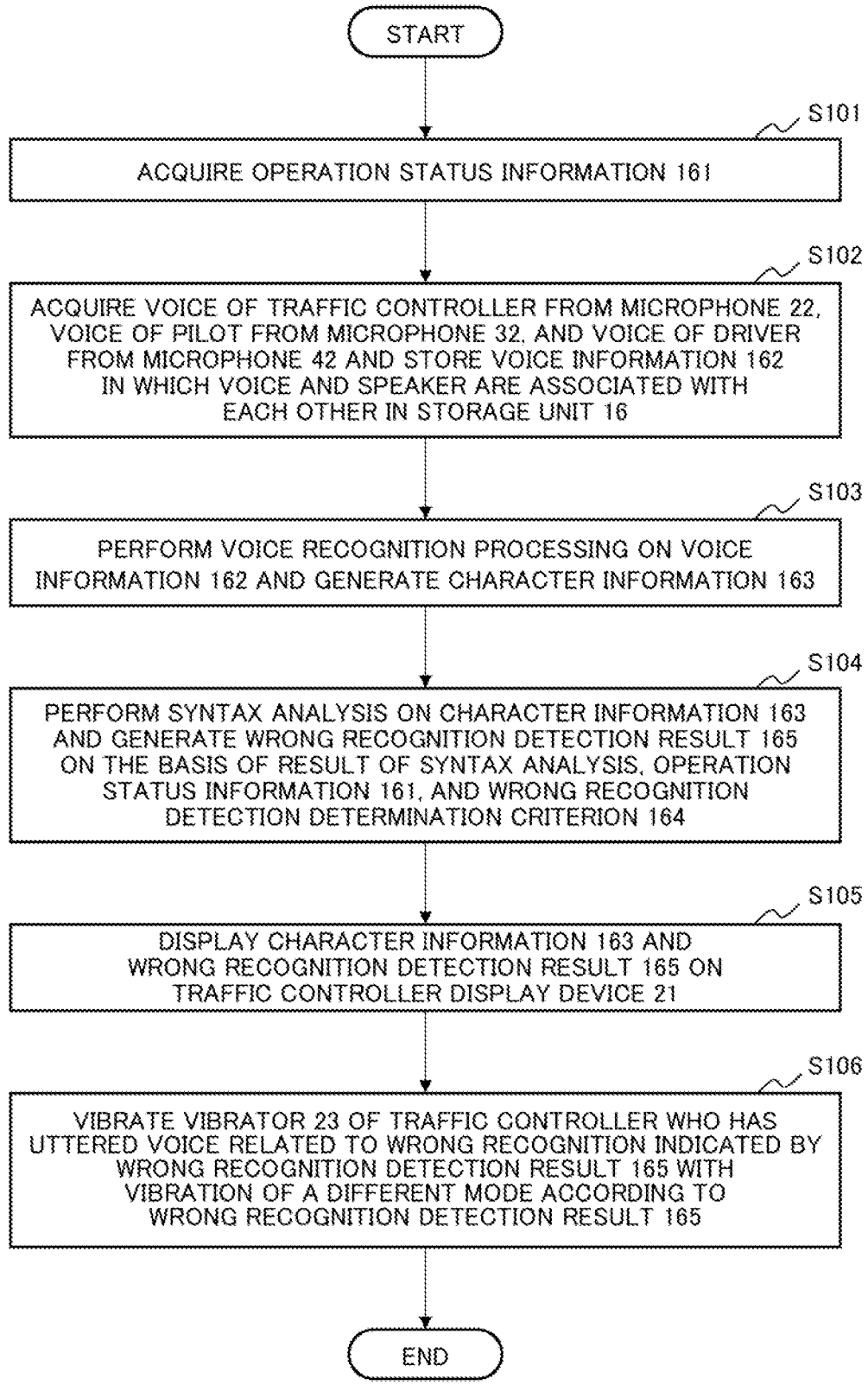
FIG. 2 is a flowchart illustrating an operation in which the operation support apparatus according to the first example embodiment of the present invention detects wrong recognition of a staff related to operation of an aircraft including a traffic controller and presents a detection result to the traffic controller.

Hereinafter, example embodiments of the present invention will be described in detail with reference to the drawings.

First Example Embodiment

FIG. 1 is a block diagram illustrating a configuration of an operation support apparatus 10 according to a first example embodiment of the present invention. The operation support apparatus 10 is an information processing apparatus that supports work of staffs involved in operation (flight) of an aircraft 30 (an example of transportation means), for example, at an airport (an example of a site where transportation means is operated). The operation support apparatus 10 is included in, for example, an air traffic control support system that supports air traffic control.

A staff involved in the operation of the aircraft 30 includes, for example, a traffic controller who performs air control (an example of a first staff), a pilot who operates the aircraft 30 (an example of a second staff), or a driver of the vehicle 40 traveling on a runway or a taxiway (an example of a second staff). The staff involved in the operation of the aircraft 30 may include staff other than the above-described traffic controller, pilot, and driver.

The operation support apparatus 10 is communicably connected to a traffic controller display device 21, a vibrators 23 attached to individual traffic controllers, and a wireless device 24. A microphone 22 is an example of an input device that inputs a voice of the traffic controller. The wireless device 24 is wirelessly communicably connected to the microphone 22, one or more aircraft 30, and one or more vehicles 40 that are used exclusively by each of one or more traffic controllers. Note that, in the description of the present example embodiment, one or more aircraft 30 or at least one of them shall be collectively referred to as aircraft 30. Similarly, one or more vehicles 40 or at least one of them will be collectively referred to as a vehicle 40.

The traffic controller display device 21 displays various information on the operation of the aircraft 30 output from the operation support apparatus 10 so that the traffic controller can visually recognize the information. The traffic controller display device 21 may be shared by a plurality of traffic controllers or may be provided for each traffic controller. The traffic controller display device 21 is an example of a first display device.

The aircraft 30 includes a display device 31 and a microphone 32. The display device 31 displays various types of information on the operation of the aircraft 30 output from the operation support apparatus 10 so that the pilot operating the aircraft 30 can visually recognize the information. The display device 31 is an example of a second display device. The microphone 32 is an example of an input device that inputs the voice of the pilot. The voice input from the microphone 32 is transmitted to the wireless device 24 via a communication function of the aircraft 30.

The vehicle 40 includes a display device 41 and a microphone 42. The display device 41 displays various types of information on the operation of the aircraft 30 output from the operation support apparatus 10 so that the driver who drives the vehicle 40 can visually recognize the information. The display device 41 is an example of a second display device. The microphone 42 is an example of an input device that inputs a voice of the driver. The voice input from microphone 42 is transmitted to wireless device 24 via a communication function of vehicle 40.

The operation support apparatus 10 includes an acquisition unit 11, a generation unit 12, a detection unit 13, a display control unit 14, a vibration control unit 15, and a storage unit 16. The acquisition unit 11, the generation unit 12, the detection unit 13, the display control unit 14, and the vibration control unit 15 are examples of an acquisition unit, a generation unit, a detection unit, a display control unit, and a vibration control unit in order.

The storage unit 16 is, for example, a storage device such as a random access memory (RAM) or a hard disk 904 described later with reference to FIG. 5. The storage unit 16 stores operation status information 161, voice information 162, character information 163, a wrong recognition detection determination criterion 164, a wrong recognition detection result 165, a mismatch detection determination criterion 166, and a mismatch detection result 167. Details of these pieces of information stored in the storage unit 16 will be described later.

The acquisition unit 11 acquires operation status information from the outside as needed, and stores the operation status information 161 in storage unit 16. For example, the acquisition unit 11 acquires the operation status information 161 indicating a position, a flight altitude, a flight speed, a flight direction, or the like of the aircraft 30 flying near an airport from an external device (not illustrated) that manages the operation status information 161, in association with an identifier of the aircraft 30. The information on the position or the like of the aircraft 30 is, for example, information that can be acquired from a radar system. Alternatively, for example, the acquisition unit 11 acquires, from the external device, the operation status information 161 indicating a position, a moving speed, a moving direction, or the like of the aircraft 30 or the vehicle 40 moving or stopping on a runway or a taxiway in the airport, in association with the identifier of the aircraft 30 or the vehicle 40. The acquisition unit 11 may acquire the operation status information 161 on the aircraft 30 or the vehicle 40 moving or stopping on the runway or the taxiway in the airport by, for example, analyzing a captured image by a surveillance camera (not illustrated) installed in the airport. Alternatively, the acquisition unit 11 may acquire the operation status information 161 indicating, for example, a place where entry is prohibited due to construction at an airport, a work status of an operation information officer or a control engineer, or the like, from a server (not illustrated) that manages the information.

The acquisition unit 11 acquires the voice uttered by the traffic controller from the microphone 22 exclusively used by the individual traffic controller via the wireless device 24, and stores the voice information 162 in which the identifier of the microphone 22 is associated with the voice in the storage unit 16. Since each traffic controller uses the microphone 22 exclusively, the identifier of the microphone 22 is an identifier that can identify the traffic controller. The acquisition unit 11 acquires the voice uttered by the pilot of the aircraft 30 from the microphone 32 via the wireless device 24, and stores the voice information 162 in which the identifier of the aircraft 30 is associated with the voice in the storage unit 16. The acquisition unit 11 acquires the voice uttered by the driver of vehicle 40 from the microphone 42 via the wireless device 24, and stores the voice information 162 in which the identifier of the vehicle 40 and the voice are associated with each other in storage unit 16.

The generation unit 12 performs voice recognition processing on the voice information 162 stored in the storage unit 16 by the acquisition unit 11. The generation unit 12 may use an existing voice recognition technology when performing voice recognition processing. The generation unit 12 generates character information 163 obtained by converting the recognized voice into characters (text), and stores the generated character information 163 in the storage unit 16. However, it is assumed that the characters included in the character information 163 are associated with the traffic controller, the aircraft 30, and the vehicle 40, which are utterance sources of the voice related to the characters, on the basis of the voice information 162.

The operation support apparatus 10 according to the present example embodiment has a function of detecting wrong recognition of a staff involved in the operation of the aircraft 30 including the traffic controller and presenting the detection result to the traffic controller. The operation support apparatus 10 also has a function of detecting a mismatch between the instruction by the traffic controller and the operation status of the aircraft 30 and presenting the detection result to the staff. Next, these functions of the operation support apparatus 10 will be described in order.

<Function of Detecting Wrong Recognition of Staff Related to Operation of Aircraft 30 and Presenting the Error to Traffic Controller>

First, an operation in which the operation support apparatus 10 according to the present example embodiment detects wrong recognition of a staff involved in the operation of the aircraft 30 including the traffic controller and presents the detection result to the traffic controller will be described.

The detection unit 13 performs syntax analysis processing on the character information 163 stored in the storage unit 16 by the generation unit 12. When performing the syntax analysis processing, the detection unit 13 may use the existing syntax analysis technique. The detection unit 13 detects the wrong recognition by the traffic controller, the pilot of the aircraft 30, the driver of the vehicle 40, or the like indicated by the character information 163 by determining whether the result of the syntax analysis processing and the operation status information 161 satisfy the wrong recognition detection determination criterion 164. Note that the wrong recognition detection determination criterion 164 is an example of a first determination criterion.

The wrong recognition detection determination criterion 164 is, for example, a criterion for determining whether there is a possibility of occurrence of an accident by an instruction from the traffic controller in the operation status indicated by the operation status information 161. Alternatively, the wrong recognition detection determination criterion 164 is, for example, a criterion for determining whether an instruction by the traffic controller and a response by the pilot of the aircraft 30 or the driver of the vehicle 40 to the instruction match each other.

For example, when the operation status information 161 indicates that there is the aircraft 30 that is entering the airport upon receiving a landing permission from the traffic controller, and the character information 163 indicates that a takeoff permission is given from the traffic controller to another aircraft 30 on the ground, the wrong recognition detection determination criterion 164 indicates that there is wrong recognition by the traffic controller. In this case, the traffic controller makes wrong recognition that the traffic controller has forgotten the presence of the aircraft 30 that has given the landing permission.

Alternatively, for example, in a case where the character information 163 indicates that the traffic controller instructs the aircraft 30 preparing for takeoff to wait in front of a runway and that the pilot of the aircraft 30 repeats to obtain the entry permission to the runway in response to the instruction, the wrong recognition detection determination criterion 164 indicates that there is wrong recognition by the pilot. In this case, the pilot of the aircraft 30 erroneously recognizes an instruction from the traffic controller to wait in front of the runway as obtaining an entry permission to the runway.

Alternatively, for example, when the operation status information 161 indicates that the vehicle 40 is present on the runway, and the character information 163 indicates that a landing permission has been given from the traffic controller to the aircraft 30 flying around the airport, the wrong recognition detection determination criterion 164 indicates that there is wrong recognition by the traffic controller. In this case, the traffic controller makes wrong recognition of forgetting the presence of the vehicle 40 on the runway.

The detection unit 13 detects wrong recognition by the above-described traffic controller or a staff involved in the operation of the aircraft 30 such as the pilot, and stores the wrong recognition detection result 165 in the storage unit 16.

The display control unit 14 displays the character information 163 and the wrong recognition detection result 165 stored in the storage unit 16 on the traffic controller display device 21. The display control unit 14 displays the character information 163 on the traffic controller display device 21 in association with an identifier (for example, name) of an utterance source (traffic controller, aircraft 30, vehicle 40, or the like).

The traffic controller display device 21 may be, for example, a monitor capable of displaying the character information 163 and the wrong recognition detection result 165, or a projector capable of projecting the character information 163 and the wrong recognition detection result 165 on a predetermined projection surface.

The display control unit 14 terminates the display of the character information 163 and the wrong recognition detection result 165 after a predetermined time has elapsed from the start of displaying the character information 163 and the wrong recognition detection result 165 on the traffic controller display device 21.

The vibration control unit 15 vibrates the vibrator 23 attached to a specific traffic controller according to the wrong recognition detection result 165. The specific traffic controller is a traffic controller who has uttered a voice related to the wrong recognition indicated by the wrong recognition detection result 165. More specifically, the specific traffic controller is, for example, a traffic controller who has made wrong recognition or a traffic controller who has issued an instruction erroneously recognized by the pilot of the aircraft 30. The vibration control unit 15 may also vibrate the vibrator 23 attached to an upper-level traffic controller that controls a plurality of traffic controllers including the specific traffic controller.

The vibration control unit 15 may control the vibrator 23 to vibrate with vibration of a different mode according to the wrong recognition detection result 165. For example, the vibration control unit 15 may control the vibrator 23 to vibrate with vibrations of different intensities according to the gravity of the accident that may occur due to the wrong recognition indicated by the wrong recognition detection result 165. However, in this case, the wrong recognition detection determination criterion 164 includes information indicating the gravity of an accident that may occur due to the wrong recognition by the traffic controller, the pilot, or the like, and the detection unit 13 can detect the gravity of the accident.

Alternatively, the vibration control unit 15 may control the vibrator 23 to vibrate with different patterns of vibration according to the type of the wrong recognition indicated by the wrong recognition detection result 165, for example. The type of wrong recognition indicates, for example, whether the wrong recognition is on the traffic controller side or on the pilot side. However, in this case, the wrong recognition detection determination criterion 164 includes information indicating the type of wrong recognition, and the detection unit 13 can detect the type of wrong recognition.

When the vibrator 23 has a speaker that outputs a voice or a function that outputs a voice by bone conduction, the vibration control unit 15 may control the vibrator 23 to output the wrong recognition detection result 165 by a voice through the speaker or a voice by bone conduction. At this time, the vibration control unit 15 may control the vibrator 23 so as to output the wrong recognition detection result 165 by a voice with a volume that can be heard only by a specific traffic controller wearing the vibrator 23.

Next, with reference to a flowchart of FIG. 2, an operation (processing) in which the operation support apparatus 10 according to the present example embodiment detects wrong recognition of a staff related to operation of an aircraft including a traffic controller and presents a detection result to the traffic controller will be described in detail.

The acquisition unit 11 acquires the operation status information 161 from the aircraft 30, the vehicle 40, a server that manages information on the operation status of the aircraft 30, or the like, and stores the acquired operation status information 161 in the storage unit 16 (step S101). The acquisition unit 11 acquires the voice of the traffic controller from the microphone 22, the voice of the pilot of the aircraft 30 from the microphone 32, and the voice of the driver of the vehicle 40 from the microphone 42 via the wireless device 24, and stores the voice information 162 in which the acquired voice and the speaker are associated with each other in the storage unit 16 (step S102).

The generation unit 12 performs voice recognition processing on the voice information 162, generates the character information 163 indicating a result of the voice recognition, and stores the generated character information 163 in the storage unit 16 (step S103). The detection unit 13 performs the syntax analysis on the character information 163, generates the wrong recognition detection result 165 on the basis of a result of the syntax analysis, the operation status information 161, and the wrong recognition detection determination criterion 164, and stores the generated recognition error detection result 165 in the storage unit 16 (step S104).

The display control unit 14 displays the character information 163 and the wrong recognition detection result 165 stored in the storage unit 16 on the traffic controller display device 21 (step S105). The vibration control unit 15 vibrates the vibrator 23 of the traffic controller who has uttered the voice related to the wrong recognition indicated by the wrong recognition detection result 165 with vibration of a different mode according to the wrong recognition detection result 165 (step S106), and the entire processing ends.

<Function of Detecting Mismatch between Instruction by Traffic Controller and Operation Status of Aircraft 30 and Presenting Mismatch to Staff Involved in Operation of Aircraft 30>

Next, an operation in which the operation support apparatus 10 according to the present example embodiment detects the mismatch between the instruction by the traffic controller and the operation status of the aircraft 30 and presents the detection result to the staff involved in the operation of the aircraft 30 will be described.

The detection unit 13 detects the mismatch between the instruction by the traffic controller and the operation status information 161 by determining whether the operation status information 161 and the result of performing the syntax analysis on the character information 163 as described above satisfy the mismatch detection determination criterion 166. Note that the mismatch detection determination criterion 166 is an example of a second determination criterion.

The mismatch detection determination criterion 166 is, for example, a criterion for determining whether the operation status of the aircraft 30 indicated by the operation status information 161 matches the instruction by the traffic controller indicated by the character information 163.

For example, when the operation status information 161 indicates that there is the aircraft 30 that is entering the airport, and the character information 163 indicates that a landing permission by the traffic controller is not given to the aircraft 30, the mismatch detection determination criterion 166 indicates that there is the mismatch between the instruction by the traffic controller and the operation status information 161. That is, in this case, the detection unit 13 detects that a situation leading to an accident has occurred in which the aircraft 30 that is not permitted to enter the runway is in a landing position.

Alternatively, for example, when the operation status information 161 indicates that there is the vehicle 40 entering the runway, and the character information 163 indicates that the vehicle 40 is not permitted to enter the runway by the traffic controller, the mismatch detection determination criterion 166 indicates that there is the mismatch between the instruction by the traffic controller and the operation status information 161. That is, in this case, the detection unit 13 detects that a situation leading to an accident has occurred in which the vehicle 40 that is not permitted to enter the runway has entered the runway.

The detection unit 13 stores the mismatch detection result 167 detected as described above in the storage unit 16.

The display control unit 14 displays the mismatch detection result 167 stored in the storage unit 16 on the traffic controller display device 21. The display control unit 14 may display the position where the mismatch has occurred in the airport indicated by the mismatch detection result 167 on the traffic controller display device 21 using a map of the airport. However, in this case, the detection unit 13 generates the mismatch detection result 167 including the position where the mismatch occurs on the basis of the position information of the aircraft 30 or the vehicle 40 indicated by the operation status information 161.

The display control unit 14 may also display the mismatch detection result 167 as a warning on the display device 31 of the aircraft 30 at the position where the mismatch occurs at the airport or the display device 41 of the vehicle 40 indicated by the mismatch detection result 167. Furthermore, in a case where the display device 31 and the display device 41 have a function of outputting voice, the display control unit 14 may output the mismatch detection result 167 from the display device 31 and the display device 41 by voice.

Figure 3:
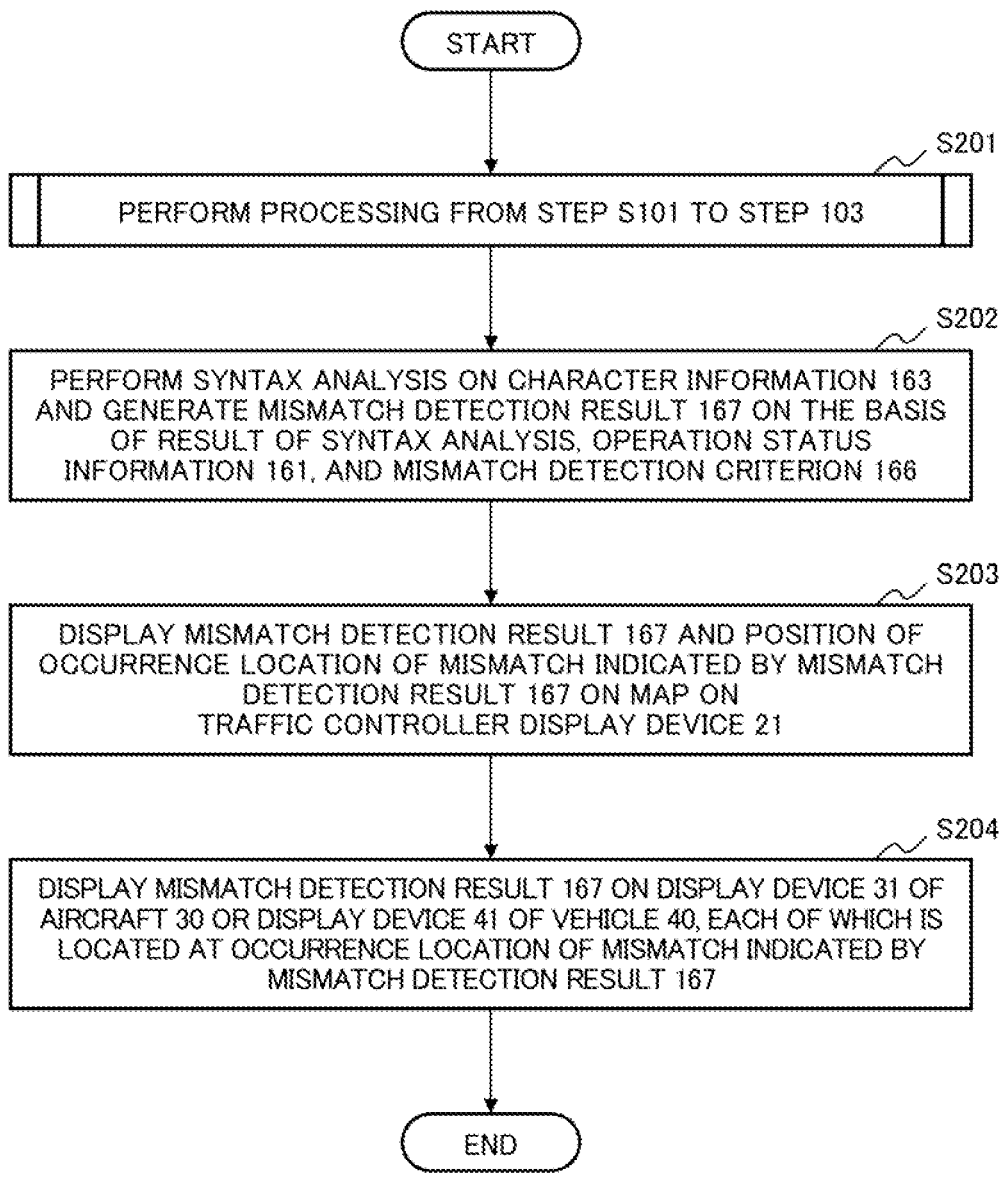
FIG. 3 is a flowchart illustrating an operation in which the operation support apparatus according to the first example embodiment of the present invention detects a mismatch between an instruction from a traffic controller and an operation status and presents a detection result to staffs, who are involved in operation of an aircraft, as well as the traffic controller.

Next, with reference to the flowchart of FIG. 3, the operation (processing) in which the operation support apparatus 10 according to the present example embodiment detects the mismatch between the instruction of the traffic controller and the operation status and presents the detection result to the staff involved in the operation of the aircraft 30 including the traffic controller will be described in detail.

The operation support apparatus 10 performs processing from step S101 to step S103 illustrated in FIG. 2 (step S201). The detection unit 13 performs the syntax analysis on the character information 163, generates the mismatch detection result 167 on the basis of the result of the syntax analysis, the operation status information 161, and the mismatch detection determination criterion 166, and stores the generated mismatch detection result 167 in the storage unit 16 (step S202).

The display control unit 14 displays the mismatch detection result 167 and the position of the occurrence location of the mismatch indicated by the mismatch detection result 167 on the airport map on the traffic controller display device 21 (step S203). The display control unit 14 displays the mismatch detection result 167 as a warning on the display device 31 of the aircraft 30 or the display device 41 of the vehicle 40, each of which is located at the occurrence location of the mismatch indicated by the mismatch detection result 167 (step S204), and the entire processing ends.

The operation support apparatus 10 according to the present example embodiment can reduce the occurrence of an accident due to wrong recognition of a staff related to the operation of the transportation means at a site where the transportation means is operated. This is because the operation support apparatus 10 recognizes voices of a first staff who gives an instruction to operate the transportation means and a second staff who is instructed, converts the voices into character information, detects wrong recognition of the staff on the basis of the character information and the operation status, and displays the detection result and the character information so as to be visually recognizable by the first staff.

Hereinafter, effects achieved by the operation support apparatus 10 according to the present example embodiment will be described in detail.

At the site where the transportation means such as the airport is operated, a staff such as a control officer who gives an instruction to operate the transportation means needs to accurately grasp a constantly changing operation status and a situation of the site and perform an appropriate instruction in real time. However, it is difficult to always accurately grasp such an operation status and a situation of a site, and since a staff who gives an instruction of the operation may forget, for example, some information on operation statuses, there have been often reported cases where the forgotten information is not taken into account and inappropriate instructions are issued. In addition, for example, even if the contents instructed by a staff who gives an instruction of the operation such as the traffic controller are appropriate, an accident may occur even when a staff such as the pilot who has received the instruction erroneously recognizes the instruction. Therefore, it is an object to reduce the occurrence of an accident due to such wrong recognition of the staff.

In view of such a problem, the operation support apparatus 10 according to the present example embodiment includes the acquisition unit 11, the generation unit 12, the detection unit 13, and the display control unit 14, and operates as described above with reference to FIGS. 1 to 3, for example. That is, the acquisition unit 11 acquires the operation status information 161 indicating the operation status of the aircraft 30 at the site where the aircraft 30 (transportation means) is operated. The generation unit 12 performs processing of recognizing voices of a traffic controller (first staff) instructing the operation of the transportation means and the pilot of the aircraft 30, the driver of the vehicle 40, or the like (second staff) instructed by the traffic controller. Then, the generation unit 12 generates the character information 163 obtained by converting the voice information 162 representing the recognized voice into characters. The detection unit 13 performs the syntax analysis on the character information 163. Then, on the basis of the operation status information 161, the result of the syntax analysis, and the wrong recognition detection determination criterion 164 (first determination criterion), the detection unit 13 detects the wrong recognition by each staff indicated by the character information 163. The display control unit 14 displays the character information 163 and the wrong recognition detection result 165 by the detection unit 13 on the traffic controller display device 21 (first display device) visually recognizable by the traffic controller.

That is, the operation support apparatus 10 according to the present example embodiment displays, for example, the voice from the traffic controller, the voice repeated by the pilot of the aircraft 30 in response to the instruction from the traffic controller, and the like as characters on the traffic controller display device 21. As a result, the traffic controller can confirm the contents of the voice of the traffic controller and the pilot or the like as characters. In addition to the above, the operation support apparatus 10 detects the wrong recognition by the traffic controller, the pilot, or the like on the basis of the contents of the voice by the traffic controller, the pilot, or the like, the operation status information 161, and the wrong recognition detection determination criterion 164, and displays the detection result on the traffic controller display device 21. Therefore, the operation support apparatus 10 according to the present example embodiment can reduce the occurrence of an accident due to the wrong recognition of the staff related to the operation of the transportation means.

Furthermore, the operation support apparatus 10 according to the present example embodiment further includes the vibration control unit 15, and vibrates the vibrator 23 attached to the specific traffic controller according to the wrong recognition detection result 165. In order to check the situation around the airport, the traffic controller often looks outside from the control tower, and does not always look at the traffic controller display device 21. The operation support apparatus 10 can quickly call attention to the traffic controller who is not looking at the traffic controller display device 21 by vibrating the vibrator 23.

In addition, the operation support apparatus 10 according to the present example embodiment controls the vibrator 23 so as to vibrate in different modes according to the wrong recognition detection result 165. As a result, the operation support apparatus 10 can cause the traffic controller to quickly grasp the content of the detected wrong recognition.

In addition, the operation support apparatus 10 according to the present example embodiment controls the vibrator 23 so as to output the wrong recognition detection result 165 by bone conduction or a voice with a volume that can be heard by only a specific traffic controller to be alerted. As a result, the operation support apparatus 10 can call attention to the specific traffic controller so as not to hinder the work of another traffic controller around the specific traffic controller.

In addition, the operation support apparatus 10 according to the present example embodiment detects the mismatch between the instruction by the traffic controller and the operation status on the basis of the operation status information 161, the content of the voice by the traffic controller or the like, and the mismatch detection determination criterion 166, and displays the detection result on the traffic controller display device 21. As a result, the traffic controller can steadily grasp that the operation status is different from the content instructed by the traffic controller, and can take measures to resolve such a situation. Therefore, the operation support apparatus 10 can reduce the occurrence of an accident at the site where the transportation means is operated.

In addition, the operation support apparatus 10 according to the present example embodiment displays the position where the mismatch indicated by the mismatch detection result 167 occurs on the traffic controller display device using the map. As a result, the operation support apparatus 10 can cause the traffic controller to clearly and quickly grasp the occurrence location of the mismatch between the instruction by the traffic controller and the operation status.

In addition, the operation support apparatus 10 according to the present example embodiment displays the mismatch detection result 167 on the display device 31 of the aircraft 30 or the display device 41 of the vehicle 40 at the position where the mismatch occurs, which is indicated by the mismatch detection result 167. That is, the operation support apparatus 10 issues a warning to the pilot of the aircraft 30, the driver of the vehicle 40, or the like, which is estimated to be the cause of the occurrence of the mismatch. As a result, the operation support apparatus 10 can reduce the occurrence of an accident at a site where the transportation means is operated.

Note that the operation support apparatus 10 according to the present example embodiment described above is a device that supports an operation of an aircraft at an airport, but the technology included in the operation support apparatus 10 is also applicable to fields other than the air traffic control described above. The operation support apparatus 10 may be, for example, a device that supports operation of a ship at a port, a device that supports operation of a train at a station, or the like.

Second Example Embodiment

Figure 4:
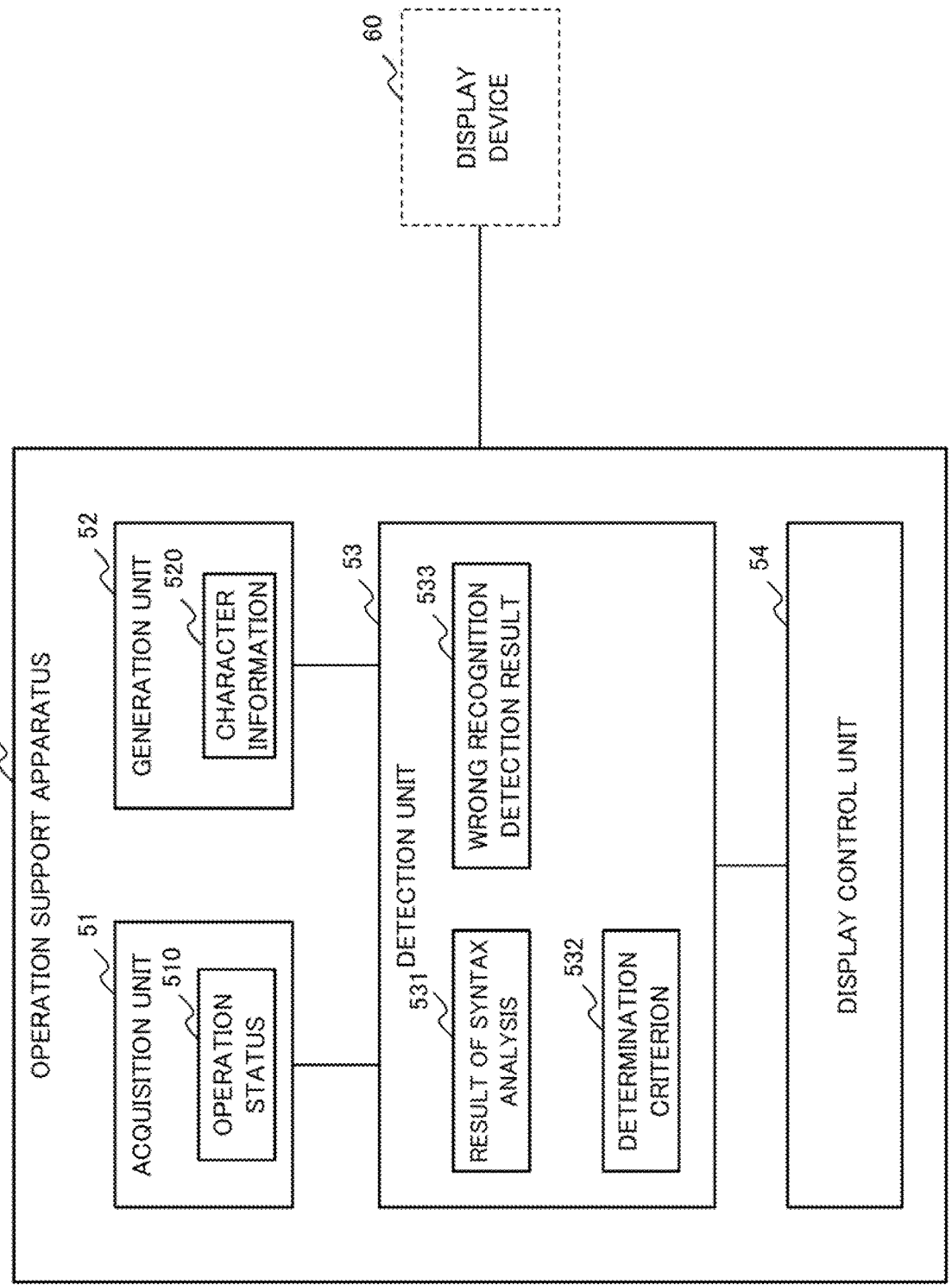
FIG. 4 is a block diagram illustrating a configuration of an operation support apparatus according to a second example embodiment of the present invention.

FIG. 4 is a block diagram illustrating a configuration of the operation support apparatus 50 according to the second example embodiment of the present invention. The operation support apparatus 50 is an information processing apparatus that supports work of a staff related to operation (operation) of transportation means at a site where the transportation means (aircraft, ship, train, and the like) such as an airport, a port, or a station is operated.

The operation support apparatus 50 according to the present example embodiment includes an acquisition unit 51, a generation unit 52, a detection unit 53, and a display control unit 54. The acquisition unit 51, the generation unit 52, the detection unit 53, and the display control unit 54 are examples of an acquisition unit, a generation unit, a detection unit, and a display control unit in order.

The acquisition unit 51 acquires the operation status 510 of the transportation means. The operation status 510 is, for example, information similar to the operation status information 161 according to the first example embodiment. For example, similarly to the acquisition unit 11 according to the first example embodiment, the acquisition unit 51 acquires the operation status 510 from the transportation means such as an aircraft, a server that manages information on the operation status 510, or the like.

The generation unit 52 performs processing of recognizing voices of a first staff who gives an instruction to operate the transportation means and a second staff instructed by the first staff. Then, the generation unit 52 generates character information 520 obtained by converting the recognized voice into characters. The first staff is, for example, a staff such as the traffic controller according to the first example embodiment. The second staff is, for example, a staff such as the pilot of the aircraft 30 or the driver of the vehicle 40 according to the first example embodiment. The character information 520 is, for example, information similar to the character information 163 according to the first example embodiment. The generation unit 52 performs processing similar to that of the generation unit 12 according to the first example embodiment, for example, to generate the character information 520.

The detection unit 53 performs syntax analysis on the character information 520. Then, the detection unit 53 detects wrong recognition by the first or second staff indicated by the character information 520 on the basis of the operation status 510, a result of syntax analysis 531, and a determination criterion 532. The determination criterion 532 is an example of the first determination criterion. The determination criterion 532 is, for example, information similar to the wrong recognition detection determination criterion 164 according to the first example embodiment. The detection unit 53 performs processing similar to that of the detection unit 13 according to the first example embodiment, for example, to generate a wrong recognition detection result 533 by the first or second staff.

The display control unit 54 displays the character information 520 and the wrong recognition detection result 533 by the detection unit 53 on the display device 60 visually recognizable by the first staff. The display device 60 is, for example, a device such as the traffic controller display device 21 according to the first example embodiment. The display control unit 54 displays the character information 520 and a wrong recognition detection result 533 on the display device 60, for example, similarly to the display control unit 14 according to the first example embodiment.

The operation support apparatus 50 according to the present example embodiment can reduce the occurrence of an accident due to wrong recognition of a staff related to the operation of the transportation means at a site where the transportation means is operated. This is because the operation support apparatus 50 recognizes voices of a first staff who gives an instruction to operate the transportation means and a second staff who is instructed, converts the voices into character information, detects wrong recognition of the staff on the basis of the character information and the operation status, and displays the detection result and the character information so as to be visually recognizable by the first staff <Hardware Configuration Example>

Each unit in the operation support apparatus illustrated in FIGS. 1 and 4 in each of the above-described example embodiments can be constructed by dedicated hardware (HW) (electronic circuit). In addition, in FIGS. 1 and 4, at least the following configuration can be regarded as a function (processing) unit (software module) of a software program including an instruction executed by a processor.

Acquisition units 11 and 51,
Generation units 12 and 52,
Detection units 13 and 53,
Display control units 14 and 54,
Vibration control unit 15;
Storage control function in storage unit 16.

However, the division of each unit illustrated in these drawings is a configuration for convenience of description, and various configurations can be assumed at the time of implementation. An example of hardware environment in this case will be described with reference to FIG. 5.

Figure 5:
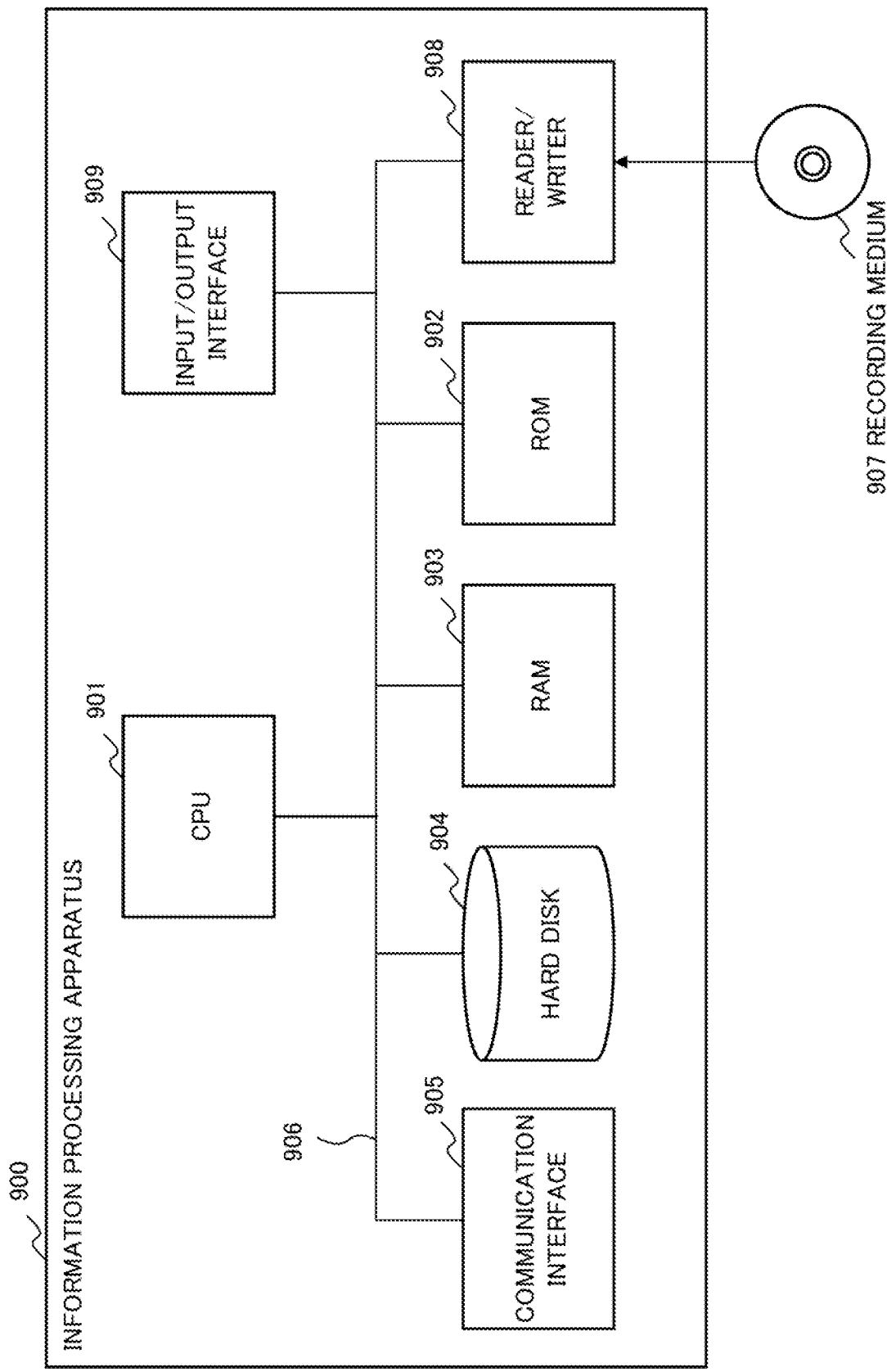
FIG. 5 is a block diagram illustrating a configuration of an information processing apparatus capable of constructing the operation support apparatus according to each example embodiment of the present invention.

FIG. 5 is a diagram for exemplarily describing a configuration of an information processing apparatus 900 (computer) capable of constructing the operation support apparatus according to each example embodiment of the present invention. That is, FIG. 5 is a configuration of a computer (information processing apparatus) capable of constructing the operation support apparatus of FIGS. 1 and 4, and represents a hardware environment capable of implementing each function in the above-described example embodiment.

The information processing apparatus 900 illustrated in FIG. 5 includes the following components as constituent elements.

Central processing unit (CPU) 901;
Read only memory (ROM) 902;
Random access memory (RAM) 903;
Hard disk (storage device) 904;
Communication interface 905;
Bus 906 (communication line);
Reader/writer 908 capable of reading and writing data stored in a recording medium 907 such as Compact Disc Read Only Memory (CD-ROM);
Input/output interface 909 such as monitor, speaker, or keyboard.

That is, the information processing apparatus 900 including the above-described components is a general computer to which these components are connected via the bus 906. The information processing apparatus 900 may include a plurality of CPUs 901 or may include a CPU 901 configured by multiple cores.

Then, the present invention described using the above-described example embodiment as an example supplies a computer program capable of implementing the following functions to the information processing apparatus 900 illustrated in FIG. 5. The function is the above-described configuration in the block configuration diagram (FIGS. 1 and 4) referred to in the description of the example embodiment or the function of the flowchart (FIGS. 2 and 3). Thereafter, the present invention is achieved by reading, interpreting, and executing the computer program on the CPU 901 of the hardware. The computer program supplied into the device may be stored in a readable/writable volatile memory (RAM 903) or a nonvolatile storage device such as the ROM 902 or the hard disk 904.

Furthermore, in the above case, a general procedure can be adopted at present as a method of supplying the computer program into the hardware. Examples of the procedure include a method of installing the program in the apparatus via various recording media 907 such as a CD-ROM, a method of downloading the program from the outside via a communication line such as the Internet, and the like. In such a case, the present invention can be understood to be constituted by a code constituting the computer program or the recording medium 907 storing the code.

The present invention has been described above using the above-described example embodiments as exemplary examples. However, the present invention is not limited to the above-described example embodiments. That is, the present invention can apply various aspects that can be understood by those skilled in the art within the scope of the present invention.

Note that some or all of the above-described example embodiments can also be described as the following supplementary notes. However, the present invention exemplarily described by the above-described example embodiments is not limited to the following.

(Supplementary Note 1)

An operation support apparatus including:
at least one memory storing a computer program; and
at least one processor configured to execute the computer program to
acquire an operation status of transportation means;
perform processing of recognizing voices of a first staff who gives an instruction to operate the transportation means and a second staff who is instructed by the first staff, and generate character information obtained by converting the recognized voice into a character;
perform syntax analysis on the character information and detect wrong recognition by the first or second staff indicated by the character information on the basis of the operation status, a result of the syntax analysis, and a first determination criterion; and
display the character information and a detection result of wrong recognition on a first display device visually recognizable by the first staff.

(Supplementary Note 2)

The operation support apparatus according to supplementary note 1, wherein
the first determination criterion represents at least one of whether there is a possibility that an accident occurs due to an instruction by the first staff in the operation status and whether the instruction by the first staff and a response by the second staff to the instruction by the first staff match each other.

(Supplementary Note 3)

The operation support apparatus according to supplementary note 1, wherein the processor is configured to execute the computer program to
terminate displaying of the character information after a predetermined time has elapsed from start of displaying of the character information on the first display device.

(Supplementary Note 4)

The operation support apparatus according to supplementary note 1, wherein the processor is configured to execute the computer program to
control a specific vibrator attached to a specific first staff to vibrate according to the detection result of the wrong recognition in a case where each of the plurality of first staffs is attached to a vibrator; and
identify, from among the plurality of first staffs, the specific first staff who has uttered a voice on the basis of an identifier of a voice input device.

(Supplementary Note 5)

The operation support apparatus according to supplementary note 4, wherein the processor is configured to execute the computer program to
control the specific vibrator to vibrate in different modes according to the detection result of the wrong recognition.

(Supplementary Note 6)

The operation support apparatus according to supplementary note 5, wherein the processor is configured to execute the computer program to detect gravity of an accident that may occur due to the wrong recognition; and control the specific vibrator to vibrate with different intensities of vibration according to the gravity of the accident.

(Supplementary Note 7)

The operation support apparatus according to supplementary note 5, wherein the processor is configured to execute the computer program to detect a type of the wrong recognition; and control the specific vibrator to vibrate with different patterns of vibration according to the type of the wrong recognition.

(Supplementary Note 8)

The operation support apparatus according to supplementary note 4, wherein the processor is configured to execute the computer program to control the specific vibrator such that the detection result of the wrong recognition is output by bone conduction or voice with a volume that can be heard only by the specific first staff.

(Supplementary Note 9)

The operation support apparatus according to supplementary note 1, wherein the processor is configured to execute the computer program to detect a mismatch between the instruction by the first staff and the operation status on the basis of the operation status, the result of the syntax analysis, and a second determination criterion; and output a detection result of the mismatch to the first display device.

(Supplementary Note 10)

The operation support apparatus according to supplementary note 9, wherein the second determination criterion indicates whether the instruction by the first staff and the operation status match each other.

(Supplementary Note 11)

The operation support apparatus according to supplementary note 9, wherein the processor is configured to execute the computer program to display, on the first display device by using a map, a position where the mismatch has occurred at a site where the transportation means is operated, the position being indicated by the detection result of the mismatch.

(Supplementary Note 12)

The operation support apparatus according to supplementary note 9, wherein the processor is configured to execute the computer program to display the detection result of the mismatch on a second display device visually recognizable by the second staff at a position where the mismatch occurs at a site where the transportation means is operated, position being indicated by the detection result of the mismatch.

(Supplementary Note 13)

The operation support apparatus according to supplementary note 9, wherein the processor is configured to execute the computer program to output, by voice, the detection result of the mismatch from a second display device and allows the second staff at a position where the mismatch occurs at a site where the transportation means is operated to hear the voice, the position being indicated by the detection result of the mismatch.

(Supplementary Note 14)

An operation support method of transportation means, including:

by an information processing apparatus, acquiring an operation status of a transportation means;

performing processing of recognizing voices of a first staff who gives an instruction to operate the transportation means and a second staff who is instructed by the first staff, and generating character information obtained by converting the recognized voice into a character;

performing syntax analysis on the character information and detecting wrong recognition by the first or second staff indicated by the character information on the basis of the operation status, a result of the syntax analysis, and a first determination criterion; and displaying the character information and the detection result of wrong recognition on a first display device visually recognizable by the first staff.

(Supplementary Note 15)

An operation support program of transportation means causing a computer to execute:

an acquisition process of acquiring an operation status of a transportation means;

a generation process of performing a process of recognizing voices of a first staff who gives an instruction to operate the transportation means and a second staff who is instructed by the first staff, and generating character information obtained by converting the recognized voice into a character;

a detection process of performing syntax analysis on the character information and detecting wrong recognition by the first or second staff indicated by the character information on the basis of the operation status, a result of the syntax analysis, and a first determination criterion; and a display control process of displaying the character information and a detection result of the wrong recognition by the detection process on a first display device visually recognizable by the first staff.

The invention claimed is:

1. An operation support apparatus, comprising:

at least one memory storing a computer program; and at least one processor configured to execute the computer program to acquire an operation status of transportation means;

perform processing of recognizing voices of a first staff who gives an instruction to operate the transportation means and a second staff who is instructed by the first staff, and generate character information obtained by converting the recognized voice into a character;

perform syntax analysis on the character information and detect wrong recognition by the first or second staff indicated by the character information based on the operation status, a result of the syntax analysis, and a first determination criterion;

control a specific vibrator to a specific first staff to vibrate according to a result of the detection of the wrong recognition in a case in which each of a plurality of first staffs is attached to a vibrator, the specific first staff having uttered a voice related to the wrong recognition;

identify, from among the plurality of first staffs, the specific first staff who has uttered a voice based on an identifier of a voice input device; and display the character information and a detection result of the wrong recognition on a first display device visually recognizable by the first staff.

2. The operation support apparatus according to claim 1, wherein the first determination criterion represents at least one of whether there is a possibility that an accident occurs due to an instruction by the first staff in the operation status and whether the instruction by the first staff and a response by the second staff to the instruction by the first staff match each other.

3. The operation support apparatus according to claim 1, wherein the at least one processor is configured to execute the computer program to terminate displaying of the character information after a predetermined time has elapsed from start of displaying of the character information on the first display device.

4. The operation support apparatus according to claim 1, wherein the at least one processor is configured to execute the computer program to control the specific vibrator to vibrate in different modes according to the detection result of the wrong recognition.

5. The operation support apparatus according to claim 4, wherein the at least one processor is configured to execute the computer program to detect gravity of an accident that may occur due to the wrong recognition; and control the specific vibrator to vibrate with different intensities of vibration according to the gravity of the accident.

6. The operation support apparatus according to claim 4, wherein the at least one processor is configured to execute the computer program to detect a type of the wrong recognition; and control the specific vibrator to vibrate with different patterns of vibration according to the type of the wrong recognition.

7. The operation support apparatus according to claim 1, wherein the at least one processor is configured to execute the computer program to control the specific vibrator such that the detection result of the wrong recognition is output by bone conduction or voice with a volume that can be heard only by the specific first staff.

8. The operation support apparatus according to claim 1, wherein the at least one processor is configured to execute the computer program to detect a mismatch between the instruction by the first staff and the operation status based on the operation status, the result of the syntax analysis, and a second determination criterion; and output a detection result of the mismatch to the first display device.

9. The operation support apparatus according to claim 8, wherein the second determination criterion indicates whether the instruction by the first staff and the operation status match each other.

10. The operation support apparatus according to claim 8, wherein the at least one processor is configured to execute the computer program to display, on the first display device by using a map, a position where the mismatch has occurred at a site where the transportation means is operated, the position being indicated by the detection result of the mismatch.

11. The operation support apparatus according to claim 8, wherein the at least one processor is configured to execute the computer program to display the detection result of the mismatch on a second display device visually recognizable by the second staff at a position where the mismatch occurs at a site where the transportation means is operated, the position being indicated by the detection result of the mismatch.

12. The operation support apparatus according to claim 8, wherein the at least one processor is configured to execute the computer program to output, by voice, the detection result of the mismatch from a second display device and allows the second staff at a position where the mismatch occurs at a site where the transportation means is operated to hear the voice, the position being indicated by the detection result of the mismatch.

13. An operation support method of transportation means, comprising:

by an information processing apparatus, acquiring an operation status of a transportation means;

performing processing of recognizing voices of a first staff who gives an instruction to operate the transportation means and a second staff who is instructed by the first staff, and generating character information obtained by converting the recognized voice into a character;

performing syntax analysis on the character information and detecting wrong recognition by the first or second staff indicated by the character information based on the operation status, a result of the syntax analysis, and a first determination criterion;

controlling a specific vibrator attached to a specific first staff to vibrate according to a result of the detection of the wrong recognition in a case in which each of a plurality of first staffs is attached to a vibrator, the specific first staff having uttered a voice to the wrong recognition;

identifying, from among the plurality of first staffs, the specific first staff who has uttered a voice based on an identifier of a voice input device; and displaying the character information and the detection result of the wrong recognition on a first display device visually recognizable by the first staff.

14. A non-transitory computer-readable recording medium storing an operation support program for transportation means for causing a computer to execute:

an acquisition process of acquiring an operation status of a transportation means;

a generation process of performing a process of recognizing voices of a first staff who gives an instruction to operate the transportation means and a second staff who is instructed by the first staff, and generating character information obtained by converting the recognized voice into a character;

a detection process of performing syntax analysis on the character information and detecting wrong recognition by the first or second staff indicated by the character information based on the operation status, a result of the syntax analysis, and a first determination criterion;

a control process of controlling a specific vibrator attached to a specific first staff to vibrate according to a result of the detection of the wrong recognition in a case in which each of a plurality of first staff is attached to a vibrator, the specific first staff having uttered a voice related to the wrong recognition;

an identification process of identify, from among the plurality of first staffs, the specific first staff who has uttered a voice based on an identifier of a voice input device; and a display control process of displaying the character information and a detection result of the wrong recognition by the detection process on a first display device visually recognizable by the first staff.

* * * * *